(12) United States Patent
Upadhyay et al.

(10) Patent No.: US 8,150,373 B1
(45) Date of Patent: Apr. 3, 2012

(54) SUPPRESSION OF SHORT MESSAGE SERVICE COMMUNICATIONS FROM A TRUSTED DOMAIN

(75) Inventors: Piyush Upadhyay, Mission, KS (US); William James Routt, Leawood, KS (US); Patrick David Wilson, Denver, CO (US)

(73) Assignee: Sprint Communications Company L.P., Overland Park, KS (US)

( * ) Notice: Subject to any disclaimer, the term of this patent is extended or adjusted under 35 U.S.C. 154(b) by 777 days.

(21) Appl. No.: 12/212,981

(22) Filed: Sep. 18, 2008

(51) Int. Cl.
*H04M 1/68* (2006.01)

(52) U.S. Cl. ........ 455/411; 455/410; 455/466; 709/202; 709/203; 709/206; 709/207; 709/218; 726/22; 726/23; 726/26; 726/14

(58) Field of Classification Search .................. 455/410, 455/411, 466; 709/202, 203, 206, 207, 218, 709/227; 726/14, 22, 23, 26
See application file for complete search history.

(56) References Cited

U.S. PATENT DOCUMENTS

| | | | |
|---|---|---|---|
| 6,819,932 B2 * | 11/2004 | Allison et al. | 455/466 |
| 7,021,534 B1 * | 4/2006 | Kiliccote | 235/380 |
| 7,548,956 B1 * | 6/2009 | Aoki et al. | 709/207 |
| 7,729,710 B2 * | 6/2010 | Jie et al. | 455/466 |
| 8,046,832 B2 * | 10/2011 | Goodman et al. | 726/23 |
| 2003/0096626 A1 * | 5/2003 | Sabo et al. | 455/466 |
| 2005/0020289 A1 * | 1/2005 | Kim et al. | 455/466 |
| 2005/0120019 A1 * | 6/2005 | Rigoutsos et al. | 707/6 |
| 2006/0041622 A1 * | 2/2006 | Qutub et al. | 709/206 |
| 2006/0105750 A1 * | 5/2006 | Zabawskyj et al. | 455/412.1 |
| 2007/0249374 A1 * | 10/2007 | Hu et al. | 455/466 |
| 2008/0114843 A1 * | 5/2008 | Shinde et al. | 709/206 |

* cited by examiner

*Primary Examiner* — Olumide T Ajibade Akonai

(57) ABSTRACT

Embodiments of the present invention relate to systems, methods, and computer-storage media for suppressing Short Message Service (SMS) communications from a Short Message peer-to-peer (SMPP) client. A selected response algorithm is provided to the SMPP client from a server. A threshold of undesired SMS communications are detected from a SPAM originator that is communicated to the server by way of the SMPP client. A challenge is communicated to the SMPP client from the server. When a challenge response is not received at the server, communications received from the SMPP client are throttled. When the challenge response is received at the server and the challenge response is incorrect, communications received from the SMPP client are also throttled. When the received challenge response is correct, a SPAM originator source identifier is communicated to the SMPP client in order for the SMPP client to throttle communications received from the SPAM originator.

20 Claims, 6 Drawing Sheets

SUPPRESSION OF SHORT MESSAGE SERVICE COMMUNICATIONS FROM A TRUSTED DOMAIN

BACKGROUND

Undesired communications, such as SPAM, consume resources and are a burden on the systems that must convey the undesired communications as well as the recipients of the undesired communications. Because of the burden and consumption of resources caused by undesired communications, those communications are typically filtered and prevented from reaching the intended recipient. But, communications from a trusted domain, such as a client of a server-client relationship, are not typically subjected to the same scrutiny because of the trusted relationship that exists. As a result, it is difficult to determine if undesired communications are being communicated by way of a trusted domain. Additionally, because a trusted domain is sometimes an aggregator that receives traffic from multiple sources, any of the multiple sources may be responsible for infusing the undesired communications along with the legitimate communications.

Additionally, the communication channel that is established between the client and the server is subject to being intercepted. This is sometimes referred to as a man-in-the-middle attack. An interception of the communications channel by an entity other that the client to whom the channel was originally established allows the intercepting entity to inject undesired communications into the communications channel without the knowledge of either the server or the client. As a result, the undesired communications injected into the communications channel appear to originate from the trusted domain, the client. This deception allows the undesired communications from the intercepting entity to avoid the scrutiny that would otherwise be employed if the communication was not perceived to be from a trusted domain.

SUMMARY

Embodiments of the present invention relate to systems, methods, and computer-storage media for suppressing Short Message Service (SMS) communications from a Short Message peer-to-peer (SMPP) client. A selected response algorithm is provided to the SMPP client from a server. The selected response algorithm is utilized by the SMPP client to generate a challenge response that verifies the identity of the SMPP client upon the receipt of a challenge from the server. An undesired SMS communication that is communicated to the server by way of the SMPP client is detected. Additionally, the challenge to the SMPP client from the server is communicated. When the challenge response is not received at the server, communications received from the SMPP client are throttled. In the alternative, when the challenge response is received at the server, the validity of the challenge response is verified to ensure the communications are from the SMPP client. In an embodiment, when the challenge response is received but determined not to be valid, communications that appear to be received from the SMPP client are throttled. In yet another embodiment, when the challenge response is received and determined to be valid, the SMPP client is provided an opportunity to suppress the undesired communications based on a source identifier provided to the SMPP client by the server.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
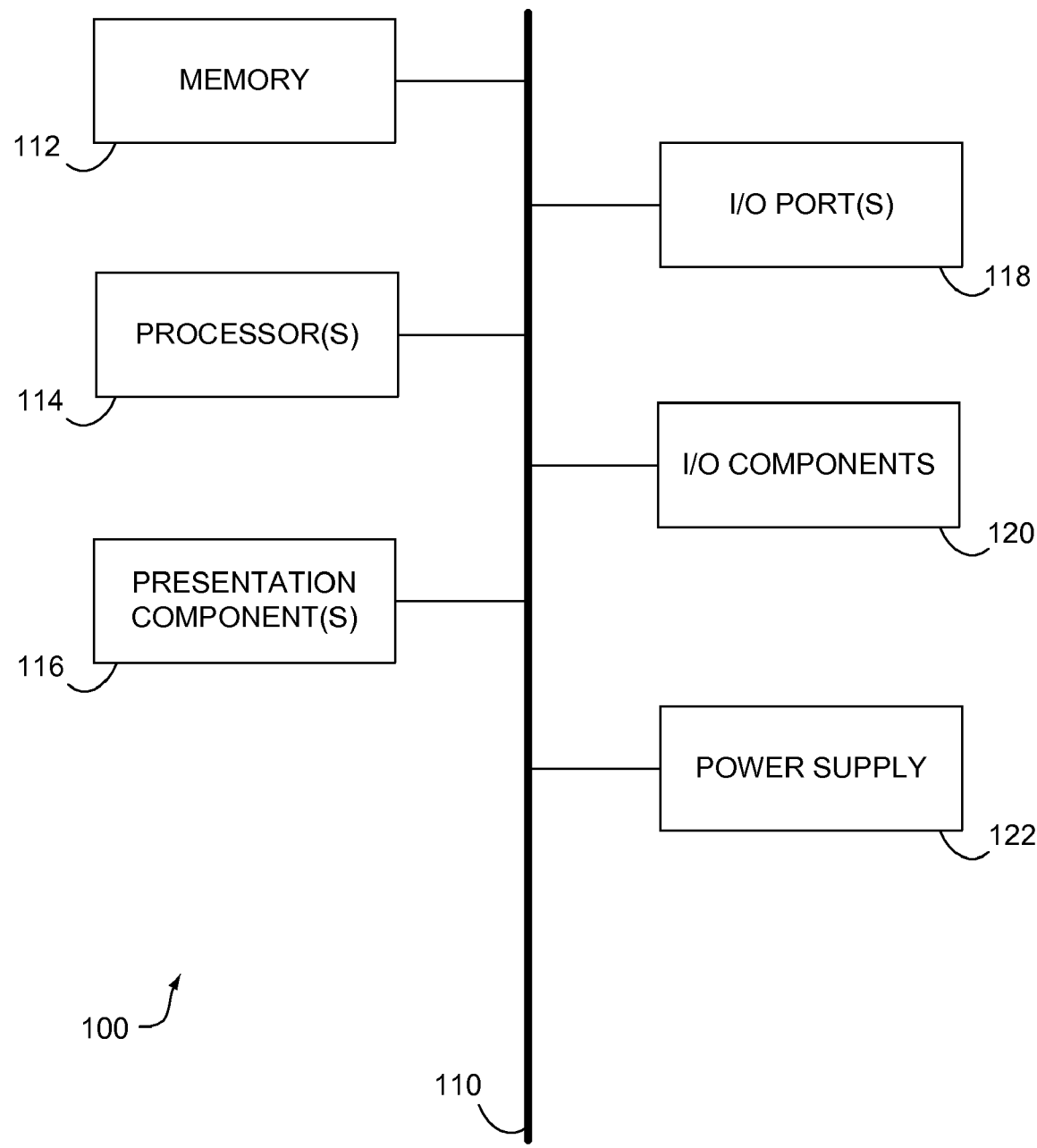
FIG. 1 depicts an exemplary computing device suitable for implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Embodiments of the present invention relate to systems, methods, and computer-storage media for suppressing Short Message Service (SMS) communications from a Short Message peer-to-peer (SMPP) client. A selected response algorithm is provided to the SMPP client from a server. The selected response algorithm is utilized by the SMPP client to generate a challenge response that verifies the identity of the SMPP client upon the receipt of a challenge from the server. An undesired SMS communication that is communicated to the server by way of the SMPP client is detected. Additionally, the challenge to the SMPP client from the server is communicated. When the challenge response is not received at the server, communications received from the SMPP client are throttled. In the alternative, when the challenge response is received at the server, the validity of the challenge response is verified to ensure the communications are from the SMPP client. In an embodiment, when the challenge response is received but determined not to be valid, communications that appear to be received from the SMPP client are throttled. In yet another embodiment, when the challenge response is received and determined to be valid, the SMPP client is provided an opportunity to suppress the undesired communications based on a source identifier provided to the SMPP client by the server.

Accordingly, in one aspect, the present invention provides a method for suppressing Short Message Service (SMS) communications from a Short Message peer-to-peer (SMPP) client. The method includes providing a selected response algorithm to the SMPP client from a server. The selected response algorithm is utilized by the SMPP client to generate a challenge response that verifies the identity of the SMPP client upon the receipt of a challenge from the server. The method also includes detecting an undesired SMS communication that is communicated to the server by way of the SMPP client. Additionally, the method may include communicating the challenge to the SMPP client from the server. When the challenge response is not received at the server, communications received from the SMPP client are throttled. When the challenge response is received at the server, the validity of the challenge response is verified to ensure the communications are from the SMPP client.

In another aspect, the present invention provides a computer-storage media having computer-executable instructions embodied thereon for suppressing Short Message Service (SMS) communications from a Short Message peer-to-peer (SMPP) client. The method includes receiving, at the SMPP client, a selected response algorithm communicated from a server. The selected response algorithm is utilized by the SMPP client to generate a challenge response that verifies the identity of the SMPP client upon the receipt of a challenge from the server. The method also includes storing the selected response algorithm, wherein the selected response algorithm is accessible by the SMPP client. The method additionally includes receiving, at the SMPP client, the challenge from the server. The challenge is communicated from the server as a result of the server detecting undesired SMS communications being communicated by way of the SMPP client. Additionally, the method includes generating the challenge response utilizing the selected response algorithm. The method also includes communicating the challenge response to the server from the SMPP client.

A third aspect of the present invention provides a method for suppressing Short Message Service (SMS) communications from a Short Message peer-to-peer (SMPP) client. The method includes providing a selected response algorithm to the SMPP client from a server. The selected response algorithm is utilized by the SMPP client to generate a challenge response that verifies the identity of the SMPP client upon the receipt of a challenge from the server. The method additionally includes detecting a first predefined threshold of undesired SMS communication (SPAM) from a SPAM originator that is communicated to the server by way of the SMPP client. The method also includes identifying a source identifier of the SPAM originator, wherein the source identifier uniquely identifies the SPAM originator. The method additionally includes communicating the challenge to the SMPP client from the server. When the challenge response is not received at the server, the method includes throttling communications received from the SMPP client. When the challenge response is received at the server and the challenge response is incorrect, the method includes throttling communications received from the SMPP client. But, when the challenge response is received at the server and the challenge response is correct, the method includes communicating the source identifier to the SMPP client from the server, wherein the source identifier allows the SMPP client to throttle communications received from the SPAM originator. Additionally, the method includes detecting a second predefined threshold of SPAM from the SPAM originator that is communicated by way of the SMPP client. The method also includes throttling communications received from the SMPP client.

Having briefly described an overview of embodiments of the present invention, an exemplary operating environment suitable for implementing embodiments hereof is described below.

Referring to the drawings in general, and initially to FIG. 1 in particular, an exemplary operating environment suitable for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of modules/components illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks or implements particular abstract data types. Embodiments may be practiced in a variety of system configurations, including handheld devices, consumer electronics, general-purpose computers, specialty computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "handheld device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier waves, or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, and the like. I/O ports 118 allow computing device 100 to be logically coupled to other devices including I/O modules 120, some of which may be built in. Illustrative modules include a microphone, joystick, game pad, satellite dish, scanner, printer, wireless device, and the like.

Figure 2:
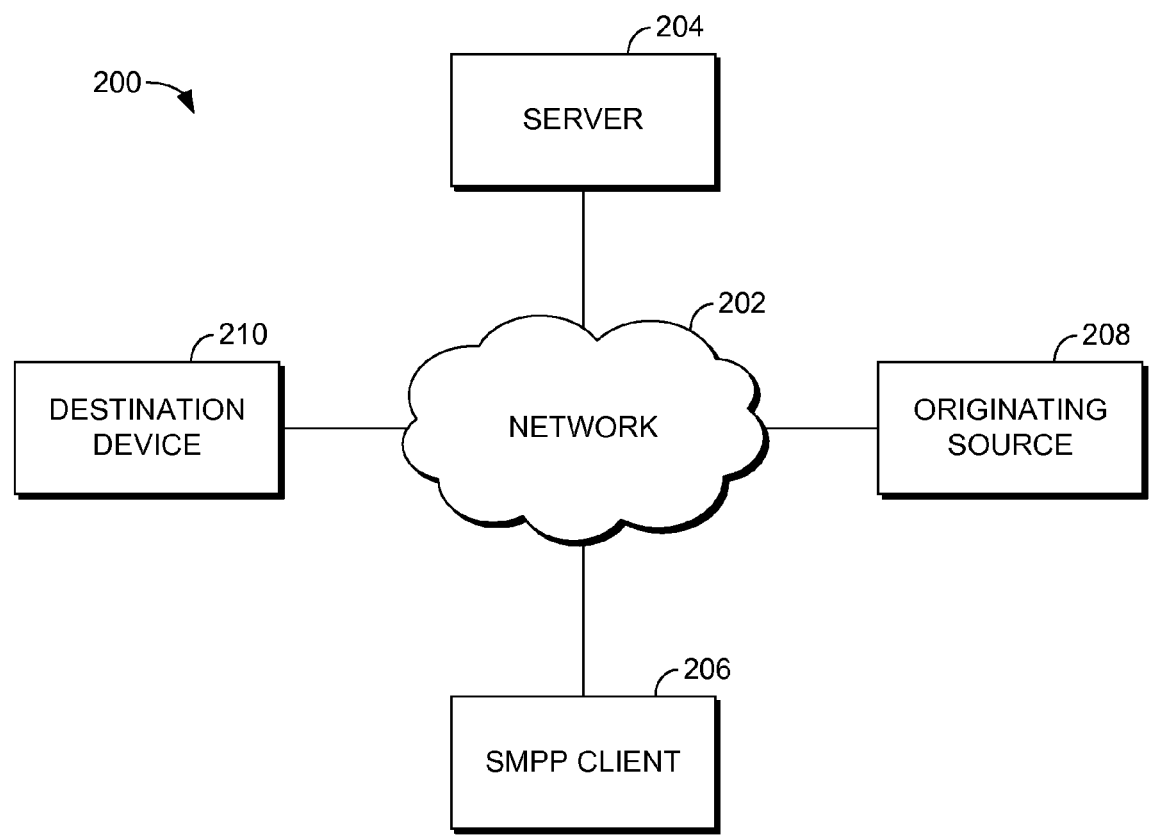
FIG. 2 depicts a block diagram illustrating an exemplary system in which embodiments of the present invention may be employed.

With reference to FIG. 2, a block diagram is provided illustrating an exemplary system 200 in which embodiments of the present invention may be employed. It should be understood that this and other arrangements described herein are set forth only as examples. Other arrangements and elements (e.g., machines, interfaces, functions, orders, and grouping of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 200 may include a server 204, a Short Message peer-to-peer (SMPP) client 206, an originating source device 208, and a destination device 210. Each of the components shown in FIG. 2 may be any type of computing device, such as computing device 100 described with reference to FIG. 1, for example. The components may communicate with each other via a network 202, which may include, without limitation, one or more local-area networks (LANs) and/or wide-area networks (WANs). Such networking environments are commonplace in offices, enterprise-wide computer networks, intranets, and the Internet. It should be understood that any number of SMPP clients, servers, originating source devices, and destination devices may be employed within the system 200 within the scope of the present invention. Additionally, other components not shown may also be included within the system 200.

The system 200 of FIG. 2 illustrates an architecture in which undesired short message services (SMS) communications are suppressed, in accordance with an embodiment of the invention. Generally an originating source, such as the originating source 208, creates an SMS message, such as a text message, that is directed to a destination device, for instance the destination device 210. An originating source may include mobile communication devices, such as devices that communicate utilizing technologies compatible with Third Generation Partnership Project (3GPP), the Third Generation Partnership Project 2 (3GPP2), IEEE 802.16 (e.g., WirelessMAN), and IEEE 802.11 (e.g. WiFi). Similar to an originating source, a destination device may also include mobile communication devices. In yet an additional example, an originating source and/or a destination device may be a computing device that communicates utilizing Internet Protocol (IP) compatible technologies.

In an embodiment, an SMPP client is an SMS aggregator that receives communications from a variety of originating sources and then serves as an intermediary between an originating source and a server that serves a destination device. In an exemplary embodiment, the SMPP client 206 is an Internet-based electronic mail (email) service that allows a user to establish an email account from which the user sends and receives emails. A user, from the originating source 208, accesses the SMPP client 206 to generate an email that is intended to be communicated as an SMS message to the destination device 210. The originating source 208 communicates with the SMPP client 206 by way of the network 202 to generate the email. Once the email has been generated by the user, the email is communicated from the SMPP client 206 to the server 204 by way of a network, such as network 202. Finally, in this exemplary embodiment, the server 204 communicates the email as an SMS message to the destination device by way of a network, such as network 202. It is understood that the network 202 can represent multiple networks utilizing multiple protocols and sometimes-incompatible technologies, but a single network is visually depicted with system 200 merely for convenience. Therefore, it is understood that a single common network of a common type or form is not implied by the network 202. For example, the communication between the originating source 208 and the SMPP client 206 may occur over the Internet, while the communication between server 204 and destination device 210 may occur over a wireless network that utilizes 3GPP compatible technology.

Generally, the communication between an SMPP client and a server is a trusted connection that results from a server-client relationship. For instance, the SMPP client 206 and the server 204 establish a server-client connection based on an SMPP protocol such that the client side is considered a trusted domain by the server. Typically, when a client of a server-client relationship is considered a trusted domain, the information communicated from the client is not subjected to the same scrutiny as if the communication was not from a trusted domain. For example, undesired communications, such as SPAM, communicated from a nontrusted domain typically pass through one or more filters, such as SPAM filters, to prevent the undesired communications from entering the server and an eventual destination device, such as destination device 210. But, because a server-client relationship typically results in a client being a trusted domain, the communications received from the client do not flow through those filters. As a result, a trusted client, such as the SMPP client 206 in an embodiment, can be utilized to communicate undesired communications through a server and eventually onto a destination device without the undesired communication being filtered by the server.

For example, in an exemplary embodiment, the originating source 208 sends an email that is classified as SPAM utilizing the SMPP client 206. The SMPP client is a trusted domain of the server 204, such that the server 204 does not subject communications received from the SMPP client 206 to filters that would typically prevent the email from being distributed if the SMPP client 206 was not a trusted client. The server 204 identifies the recipient of the email as the destination device 210. The destination device 210 receives the email, which in this exemplary embodiment the destination device 210 is a mobile communications device, such as a 3GPP enabled phone. Therefore, in an exemplary situation, the mobile communication device is charged a fee for receiving the email as an SMS message. The receipt of an undesired communication that results in an additional expense to the owner is a burden and potential annoyance for the owner of the destination device 210. As a result, it is desirable to suppress undesired communications that are received by way of a trusted domain.

In addition to undesired communications being communicated by way of a trusted client, an undesired communication may also enter into a system from an originating source when the originating source "hijacks" the communication channel established between a trusted domain and a server. A communication channel is hijacked, in an embodiment, when the originating source pretends to be the trusted domain such that the server believes communications from the originating source are actually coming by way of the trusted domain. The utilization of the communication channel that exists between a server and a client by an element other than the client for which the channel was established is sometimes referred to as a man-in-the-middle attack.

Man-in-the-middle attacks and sending of SPAM by way of a trusted domain are two examples of why the suppression of undesired communications is desirable in some situations. In order to suppress undesired communications, an exemplary embodiment of the present invention throttles communications associated with a particular originating source or client. Throttling, in an embodiment includes the limiting of the quantity or number of communications received from the identified source or client. In yet another embodiment, throttling includes the prevention of all communications from the identified source or client. In yet another embodiment, throttling includes subjecting communications received from the identified source or client to additional filters and/or controls. For example, when undesired communications are identified from a particular client, such as SMPP client 206, a server, such as server 204, suppresses communications from the client by subjecting the communications to SPAM filters. The employment of filters results in a restriction in the flow of communications received from a client that are directed to one or more destination devices that are associated with a server.

In an embodiment, a server and a client are computing devices that are operable to communicate with one another utilizing a protocol compatible with SMPP. In particular, the SMPP compatible protocol may utilize pairs of requests/response protocol data units (PDUs) or packets exchanged over an OSI layer 4 connection, such as a TCP session. Typically PDUs are binary encoded for efficiency. In an additional embodiment, the SMPP compatible protocol supports either synchronous or asynchronous data exchange. For example, synchronous data exchange traditionally provides that each peer must wait for a response for each PDU being sent. Asynchronous data exchange typically allows for multiple requests to be communicated with the respective responses acknowledged by the other peer in a skew order.

In another embodiment, a server and client communicate utilizing a protocol compatible with SMPP that is further enhanced to support suppression of SMS communications. Enhancements include additional SMPP headers that include sm_challenge, sm_challenge_response, sm_challenge_sraddr, and sm_challenge_sraddr_response. Typically, the sm_challenge header is associated with a PDU communicated from a server to a client when the server identifies undesired communications from the client. For example, when a server identifies SPAM from a client, the server attaches an sm_challenge=001 header to a deliver_sm PDU. The hexadecimal associated with a header indicates an option. For example, the following options may be associated with sm_challenge headers:

| Hexadecimal | Interpretation |
|---|---|
| 000 | Normal operation |
| 001 | Server is sending a challenge to the client |
| 010 | Retry send of the challenge |
| 011 | Server is blocking connection to client |

Continuing with the embodiment, when a client receives a PDU with an sm_challenge header associated, the client interprets the associated hexadecimal to identify the meaning of the sm_challenge. Typically, when the sm_challenge is sm_challenge=001, the client will respond with a challenge response. For example, the client may respond with an sm_challenge_response with an associated number derived from a response algorithm.

In yet another embodiment, a response algorithm is a verification formula that is provided by the server 204 to the SMPP client 206, to facilitate a verification of the SMPP client 206 as the entity to which the server 204 originally communicated the response algorithm. For example, during the initial setup of a communication channel between the server 204 and the SMPP client 206, the server 204 communicates a response algorithm to the SMPP client 206 while establishing the server-client relationship. The SMPP client 206 maintains the response algorithm for use when verifying the identity of the client. In an exemplary embodiment, the response algorithm is a formula that utilizes information contained in PDUs and/or headers communicated by a client to a server. For example, the response algorithm may request the SMPP client 206 to calculate the number of SMS communications the SMPP client 206 has communicated to the server 204 within a predefined time, such as the previous five minutes. It is obvious to those with ordinary skill that the formula is not limited to the examples provided above, but instead the formula can utilize any information to which both the SMPP client 206 and the server 204 have access.

When the server 204 communicates a challenge to the SMPP client 206 and the SMPP client 206 does not respond with the correct response, in an embodiment, the server will determine that a man-in-the-middle attack it occurring. As a result, the server 204 can throttle communications associated with the man-in-the-middle attack. In an alternative, the server 204 terminates the communications channel and reestablishes a communications channel with an intended trusted domain. Additionally, in another embodiment, if a response is not received to a challenge request sent by the server 204, the server 204 can also determine a man-in-the-middle attack is occurring and terminate communication associated with the attack.

In still an additional embodiment, when the server 204 receives a valid response from the SMPP client 206, the server 204 can determine that communications from the SMPP client 206 are legitimately coming from a trusted domain and are not the product of a man-in-the-middle attack. When the server 204 determines the SMPP client 206 is a trusted domain, the server 204 can send a source identifier of the undesired communications to the SMPP client 206. In this example, the server 204 provides the source identifier to the SMPP client 206 to allow the SMPP client 206 to suppress or handle communications associated with the source identifier. For example, if the SMPP client 206 is an email aggregator, and the source identifier is associated with an account of the email aggregator, the email aggregator can suspend activity associated with the account. A source identifier is an identifier of the undesired communications. For example, an email address, an Internet Protocol (IP) address, a Media Access Control (MAC) address, an Electronic Serial Number (ESN), a Mobile Equipment Identifier (MEID), and a Mobile Station International Subscriber Directory Number (MSISDN) all are unique identifiers that could be utilized to identify an originating source of undesired communications. It is understood that additional unique identifiers exist and the foregoing examples are merely a representative sample of unique identifiers. In the previous example, the source identifier is included as an sm_challenge_sraddr header associated with a PDU exchanged between the server 204 and the SMPP client 206.

In yet another embodiment, when the SMPP client 206 receives a source identifier from the server 204, the SMPP client 206 provides a response back to the server 204. For example, an sm_challenge_sraddr_response header may be included with a PDU communicated from the SMPP client 206 to the server 204. The source identifier response provides the server 204 with an indication as to the status of the SMPP client 206. Examples of source identifier response options that may be included with a source identifier response include:

| Hexadecimal | Interpretation |
| --- | --- |
| 001 | In process of source identifier verification |
| 010 | Source identifier verified |
| 011 | Source identifier not verified, client will handle |
| 100 | Source identifier not verified, server should handle |

The above examples allow the server 204 to be aware of the state of the SMPP client 206 with respect to the source identifier. For example, after receiving a source identifier, the SMPP client 206 may reply to the server 204 with a header stating sm_challenge_sraddr_response=001, which indicates that the SMPP client 206 is attempting to verify that the SMPP client 206 can exert control over the source identifier, such as suspending an associated account or restricting privileges associated with the source identifier. Another example of a response includes a header sm_challenge_sraddr_response=011, which indicates that while the source identifier could not be verified by the SMPP client 206, the SMPP client 206 will throttle communications associated with the source identifier.

It is understood that the exemplary headers discussed above, such as sm_challenge_sraddr_response and sm_challenge are merely exemplary forms of a header and are not limiting on the structure, formation, or format of the passing of information between the server 204 and the client 206. For example, a challenge in an alternative embodiment is indicated by "challenge_sms." In yet another embodiment a challenge is indicated by "challenge." Therefore, it is obvious to those with ordinary skill in the art that the formats provided are meant to assist the understanding of the present invention and are not limiting as to the scope of the present invention. Similarly, the hexadecimals discussed above are merely exemplary and not limiting as to the scope of the present invention. The values, sequence, and pairing are not limited to those embodiments provided. For example, numerals 0-9 and letters A-F may be combined in any number of combinations to indicate a particular status or response.

Figure 3:
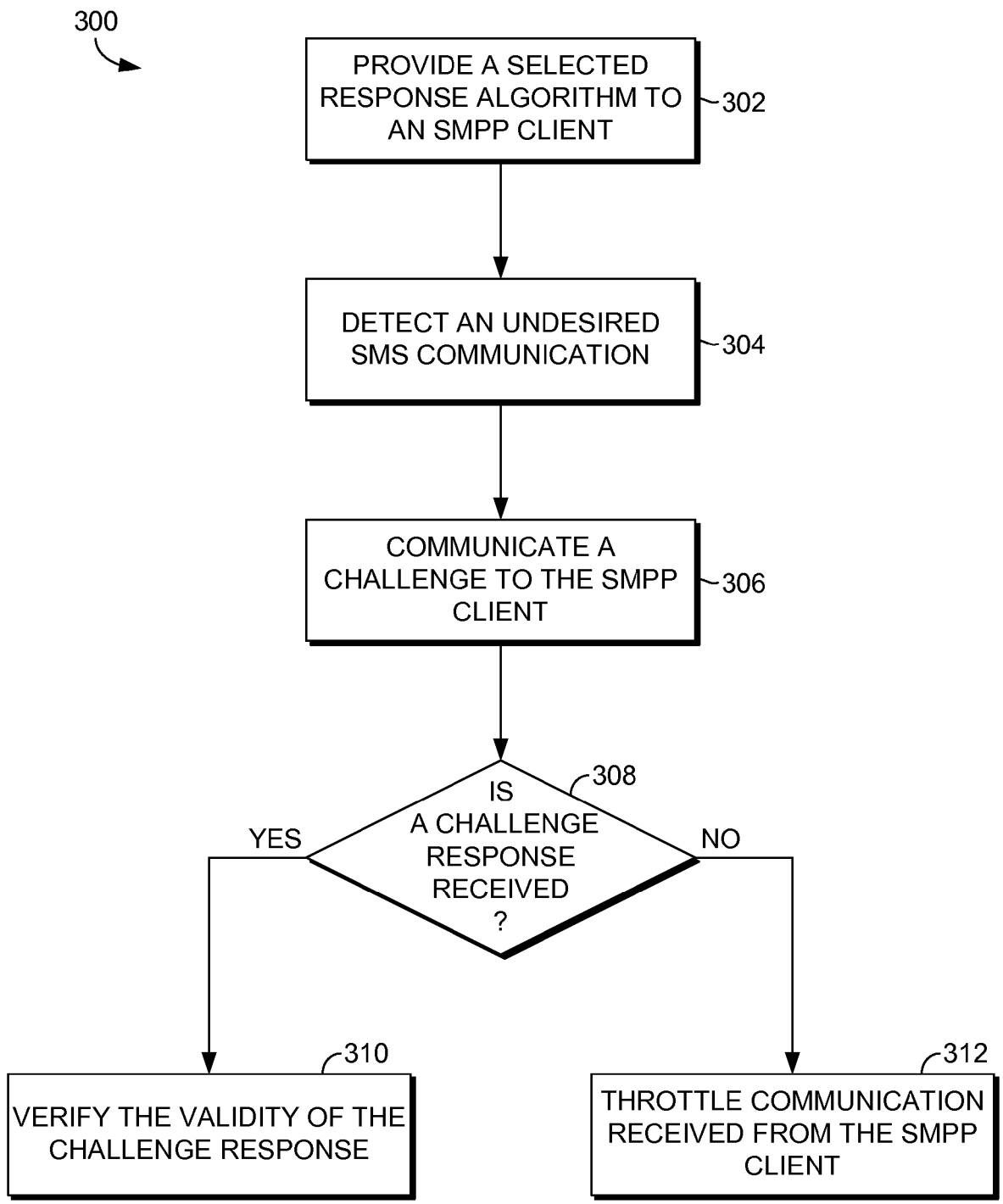
FIG. 3 is a flow diagram illustrating a method for suppressing SMS communications from an SMPP client in accordance with an embodiment of the present invention.

Turning to FIG. 3, a flow diagram is provided illustrating a method 300 for suppressing SMS communications from an SMPP client in accordance with an embodiment of the present invention. Initially, as shown at block 302, a selected response algorithm is provided to an SMPP client, such as SMPP client 206 of FIG. 2. A server may provide the selected response algorithm to the SMPP client 206 in a variety of different manners within the scope of embodiments of the present invention. For example, during the establishment of a server-client relationship, the server 204 can communicate a selected algorithm from a selection of possible algorithms. As previously discussed, in an embodiment the algorithm will be employed by the SMPP client 206 to provide a response to a challenge. In another embodiment, the association between the selected algorithm and the SMPP client 206 is stored at the server to facilitate verifying a response supplied by the client. For example, the server 204 may utilize the same selected algorithm to ensure that a response provided by the SMPP client 206 corresponds with a value achieved by the selected algorithm.

As previously discussed, the selected algorithm can utilize information that is known to both the server 204 and the SMPP client 206. In an embodiment, the information that is utilized by the selected response algorithm is the number of SMS messages communicated during a defined time. For example, the selected algorithm may be a simple equation that requires the SMPP client 206 to count the number of unique SMS communications communicated to the server 204 during the previous 30 seconds. An entity performing a man-in-the-middle attack that has hijacked the connection between the server 204 and the SMPP client 206 typically will not be able to intercept and monitor the number of SMS communications communicated by the SMPP client 206. Therefore, the entity performing the man-in-the-middle attack would not be able to provide a response to a challenge. In another embodiment, if the entity performing a man-in-the-middle attack was able to monitor the number of communications that were communicated from the SMPP client 206 to the server 204, the entity would not know the time for which the response algorithm counts the number of communications because the selected response algorithm is communicated from the server 204 to the SMPP client 206 during the initial establishment of the server-client relationship.

In yet an additional embodiment, the selected algorithm utilizes hash values associated with a defined number of PDUs or packets communicated from the SMPP client 206 to the server 204. Or, in an additional embodiment, the algorithm utilizes information communicated from the server 204 to the SMPP client 206.

When undesired SMS communications are detected, as shown at block 304, a challenge is communicated to the SMPP client 206, of FIG. 2. In an exemplary embodiment, undesired SMS communications are detected by computing programs operating in conjunction with the server 204 of FIG. 2. For example, a computing program that functions to identify characteristics of SMS communications that indicate a particular SMS communication is undesirable are employed to detect undesired SMS communications. It should be obvious to one of ordinary skill in the art that such computing programs exist for detecting undesired communications.

In yet another embodiment, the undesired SMS communications are detected based on identified information associated with the SMS communication. For example, if a multitude of SMS communications all include a similar message or originate from a common source, then the SMS communications with the common information may be identified as undesired communications.

In an embodiment, when communicating a challenge to an SMPP client, such as SMPP client 206 of FIG. 2, the challenge is associated with a packet of information that is communicated to the SMPP client regardless of the challenge being communicated. For example, packets of information are regularly exchanged between a server and a client as part of the server-client relationship. Accordingly, the challenge can be appended or added onto at least one of those regular communications. For example, an additional header that is interpretable by a client as a challenge can be added to a packet or PDU exchanged from the server to the client. In an additional embodiment, a challenge is communicated independent of regular communications. Therefore, the challenge is communicated as PDUs or packets to the client as opposed to appending to an otherwise communicated PDU or packet.

At a block 308 a determination is made whether a challenge response is received. For example, a server, such as server 204 of FIG. 2, makes a determination whether a client to whom a challenge was communicated has responded with a challenge response. In an exemplary embodiment, a time period is predefined as to how long the server waits before determining if a response to the challenge has been received. For example, depending on the communication channel and the demand for resource, a challenge request can take time to reach a destination, be processed, and responded to by the destination. Therefore, a delay will result from the time of sending the challenge to the time when a response should be received in reply. As a result, a delay should be incorporated into receiving a challenge response. In an additional embodiment, the determination is made multiple times if the previous determinations did not result in an identification of a response being received. Therefore, in the previous example when a response is not determined to have been received at first, another delay period is performed before attempting to determine if a challenge response has been received.

When the challenge response is determined to have been received, the validity of the challenge response is verified, as shown at block 310. The validity of the challenge response, in an embodiment, includes utilizing the selected algorithm provided at block 302. For example, if the selected algorithm required a client to respond with the number of SMS communications communicated in the last 30 seconds from the client, a server verifying the response algorithm will calculate the number of SMS communications received from the client within the same time period. The server calculation should correspond with the challenge response in order for the challenge response to be valid. If a discrepancy exists between the expected challenge response and the received challenge response, then the challenge response may be determined invalid. In an exemplary embodiment, when a challenge response is determined invalid, an additional challenge is communicated to provide another opportunity for a valid challenge response to be received. In yet another embodiment, if the challenge response that is received is incorrect, a man-in-the-middle attack is suspected and appropriate actions are taken to prevent undesired communications from resulting out of the man-in-the-middle attack.

When a challenge response is not determined to have been received at block 308, communications received from the client are throttled, as shown at a block 312. As previously discussed, in an embodiment the throttling of the communications includes limiting or filtering select communications from the client. In an additional embodiment, throttling includes blocking all communications from the client. It is understood that any combination of throttling is within the scope of the present invention.

Figure 4:
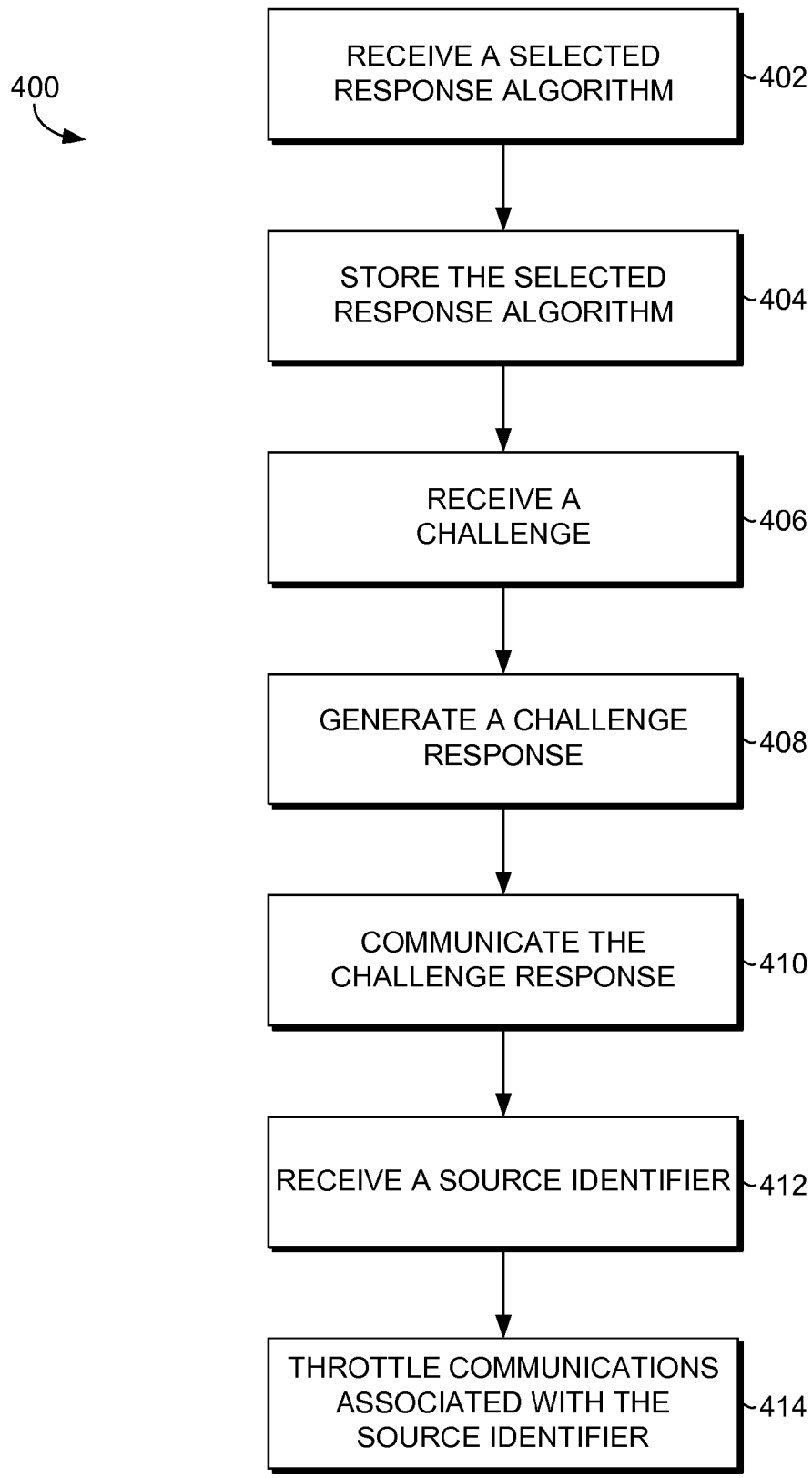
FIG. 4 is another flow diagram illustrating a method for suppressing SMS communications from an SMPP client in accordance with an embodiment of the present invention.

Turning now to FIG. 4, a flow diagram is illustrated showing method 400 for suppressing SMS communications from an SMPP client in accordance with an embodiment of the present invention. As shown at a block 402, the SMPP client, such as SMPP client 206 of FIG. 2, receives a selected response algorithm. In an embodiment, the selected response algorithm is received from a server, such as the server 204 of FIG. 2. As previously described, the response algorithm may be received during the initial establishment of a server-client relationship between the SMPP client and the server. The selected algorithm is stored, as shown at a block 404. In an exemplary embodiment, the SMPP client that received the response algorithm includes a processor and memory, such that the response algorithm is stored and accessible from the memory. For instance, when the SMPP client is a computing device, such as computing device 100 of FIG. 1, the response algorithm is stored in computer-storage media associated with the computing device.

As shown at a block 406, the SMPP client receives a challenge. For example, a server that detects undesired communications that are being communicated by way of the SMPP client, the server sends a challenge to the SMPP client in an attempt of ruling out a man-in-the-middle attack. In an embodiment, the SMPP client receives the challenge as part of a PDU communicated from the server. Once received, the challenge may include one or more options. For example, the challenge may indicate that this is an initial challenge or a subsequent challenge. The challenge may also indicate that communications from the SMPP client will be throttled until a valid response is communicated from the SMPP client. In an exemplary embodiment, the various options associated with the challenge are identified by a hexadecimal associated with a challenge header. The hexadecimal and challenge header are described to both the server and the SMPP client in an enhanced SMPP protocol to which each has access.

Generation of a challenge response, as shown at a block 408, is done by the SMPP client. For example, once the SMPP client receives and interprets a challenge, the SMPP client accesses the stored algorithm to aid in the generation of a challenge response. The challenge response in an embodiment includes the result of the challenge response. In an additional embodiment, the challenge response includes an indication of the status of the SMPP client. For example, the status of the SMPP client may include throttling traffic, attempting to generate a result with the response algorithm, and providing the result of the response algorithm.

As shown at block 410, the challenge response is communicated. In an embodiment, the challenge response is communicated in association with a PDU or a packet sent from the SMPP client 206 of FIG. 2 to the server 204 of FIG. 2. For example, the generated response is appended to a packet of information as a header that is identifiable by the recipient of the packet. In an additional exemplary embodiment, the challenge response is communicated to the recipient without being appended to another packet or PDU, but instead the challenge response is sent independently.

In yet another embodiment, the challenge response is sent to a recipient, such as the server 204 of FIG. 2, such that the recipient verifies the challenge response. When the recipient verifies that a man-in-the-middle attack is not occurring, the recipient then sends a source identifier associated with detected undesirable communications. As shown at a block 412, the source identifier is received by the SMPP client 206 of FIG. 2. The source identifier, in an embodiment, is communicated to provide the SMPP client 206 of FIG. 2 an opportunity to control the communications associated with the source identifier. For example, if controlling the undesired communications was left to a server that detected the undesired communication, the server may throttle all communications from the SMPP client 206, even those communications associated with sources other than the identified source. Providing the SMPP client 206 an opportunity to control communications associated with the source identifier prevents other source identifiers associated with the SMPP client 206 from being affected by the throttling of communications as a result of the undesired communications.

In an additional embodiment, the source identifier is a unique identifier that the SMPP client 206 of FIG. 2 is able to verify as a source that can be throttled or controlled. But, if the source identifier is not verified or the SMPP client 206 cannot determine if the source identifier can be controlled, the SMPP client 206 can reply that the SMPP client 206 cannot throttle communications associated with the source identifier. In this example, a server, such as server 204 of FIG. 2, can therefore throttle all communications from the SMPP client 206, or in the alternative, throttle communications associated with the source identifier.

As shown at a block 414, communications associated with the source identifier are throttled. For example, when the SMPP client 206 of FIG. 2 receives the source identifier, communications associated with the source identifier are throttled to suppress the undesired communications. In an additional embodiment, the source identifier is verified as being associated with a particular account to which the SMPP client 206 can exert control. Therefore, the SMPP client 206 can prevent all communications associated with the source identifier from being communicated to the server 204 of FIG. 2.

Figure 5:
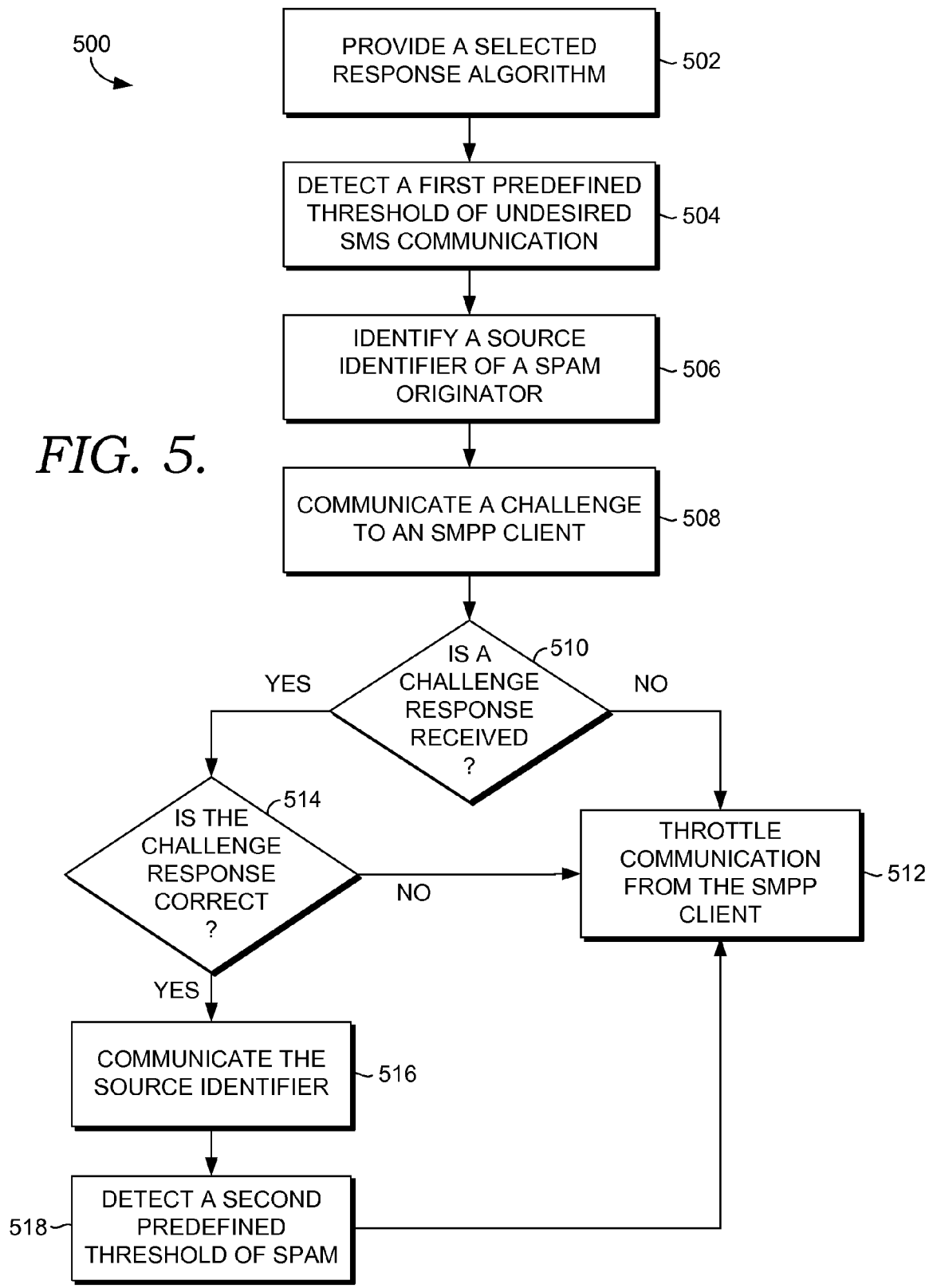
FIG. 5 is a third flow diagram illustrating a method for suppressing SMS communications from an SMPP client in accordance with an embodiment of the present invention.

Referring now to FIG. 5, a flow diagram is illustrated showing a method 500 for suppressing SMS communications from an SMPP client in accordance with an embodiment of the present invention. As shown at a block 502, a selected response algorithm is provided. For example a server, such as server 204 of FIG. 2, provides a selected response algorithm to a client, such as SMPP client 206 of FIG. 2. The server detects a first predefined threshold of undesired SMS communications that are communicated by way of the client, as shown at a block 504. For example, a predefined threshold is established by an operator of the server to indicate a number of undesired communication that are no longer tolerable. In an embodiment, the threshold may be based on resources consumed as a result of the undesired communications or the threshold may be based on the tolerance of the ultimate recipients who receive the undesired communications. In an additional embodiment, the threshold is manually configured or in the alternative it is automatically established. For example, the threshold may depend on variables associated with resources available and resources consumed as a result of the undesired communications.

The undesired communications, such as SPAM, are evaluated to identify a source identifier of the SPAM originator, as shown at a block 506. For example, a "from" email address of the SPAM may indicate a common source that is identifiable by the unique address. In an additional embodiment, metadata of the SPAM may include a unique identifier of the originating source, such as an IP address or MAC address. In yet another exemplary embodiment, the unique source identifier is a phone number of the SPAM sender when the SPAM originates as a SMS message as opposed to an IP-based communication.

A challenge is communicated to the client, as shown at a block 508. For example, once the SPAM is detected and it is identified that the SPAM is being communicated by way of the client, a challenge header is added to a PDU being communicated to the client. The challenge, in an embodiment, signals the client to utilize the previously received response algorithm to generate a challenge response. A determination is made as to whether the challenge response is received, as shown at a block 510. When a challenge response is not received, communications from the client are throttled, as shown at a block 512. The throttling of communications from the client prevents a man-in-the-middle attack from utilizing the communication channel originally established to facilitate communication between a server and a trusted domain. But, if the communication channel is compromised by a man-in-the-middle attack, the throttling of communications that are received through that communications channel prevents the SPAM from being propagated to the ultimate destination.

However, when a challenge response is determined to have been received, a determination if the challenge response is correct is made, as shown at a block 514. When the challenge response is determined to be incorrect, communications from the client are throttled, as shown at the block 512. For example, an entity performing a man-in-the-middle attack may attempt to respond to an intercepted challenge in an effort to maintain the communications channel that the entity has hijacked. In the effort to maintain the communications channel, the entity responsible for the man-in-the-middle attack may make a best effort attempt to provide a challenge response. But, because the selected response algorithm is variable and established along with the communications channel, the entity responsible for the man-in-the-middle attack cannot utilize intercepted information to generate a correct challenge response because the algorithm is unknown to that entity.

When the challenge response is verified as being correct, the source identifier associated with the SPAM is communicated, as shown at a block 516. In an embodiment, the source identifier is communicated to provide the client with an opportunity to throttle the SPAM before the server attempts to suppress the SPAM by throttling communications from the client. Therefore, in an additional embodiment, the client receives the source identifier and attempts to verify the originating source of the SPAM with the intention of controlling the SPAM associated with the source identifier. But, when the client cannot or fails to suppress SPAM, especially SPAM associated with the source identifier, the server begins suppressing the SPAM. When a second predefined threshold of SPAM is detected, as shown at block 518, communications from the client are throttled, as shown at the block 512. In an embodiment, the second predefined threshold of SPAM is a threshold that is lower than the first predefined threshold. But, in an additional embodiment, the second and first predefined thresholds are comparable. While, in yet another embodiment, the second predefined threshold is higher than the first predefined threshold. The detection of a second predefined threshold of SPAM indicates, in an embodiment, that the client has failed or cannot suppress the SPAM. Therefore, the suppression of SPAM must occur by way of the server, such as server 204 of FIG. 2.

Figure 6:
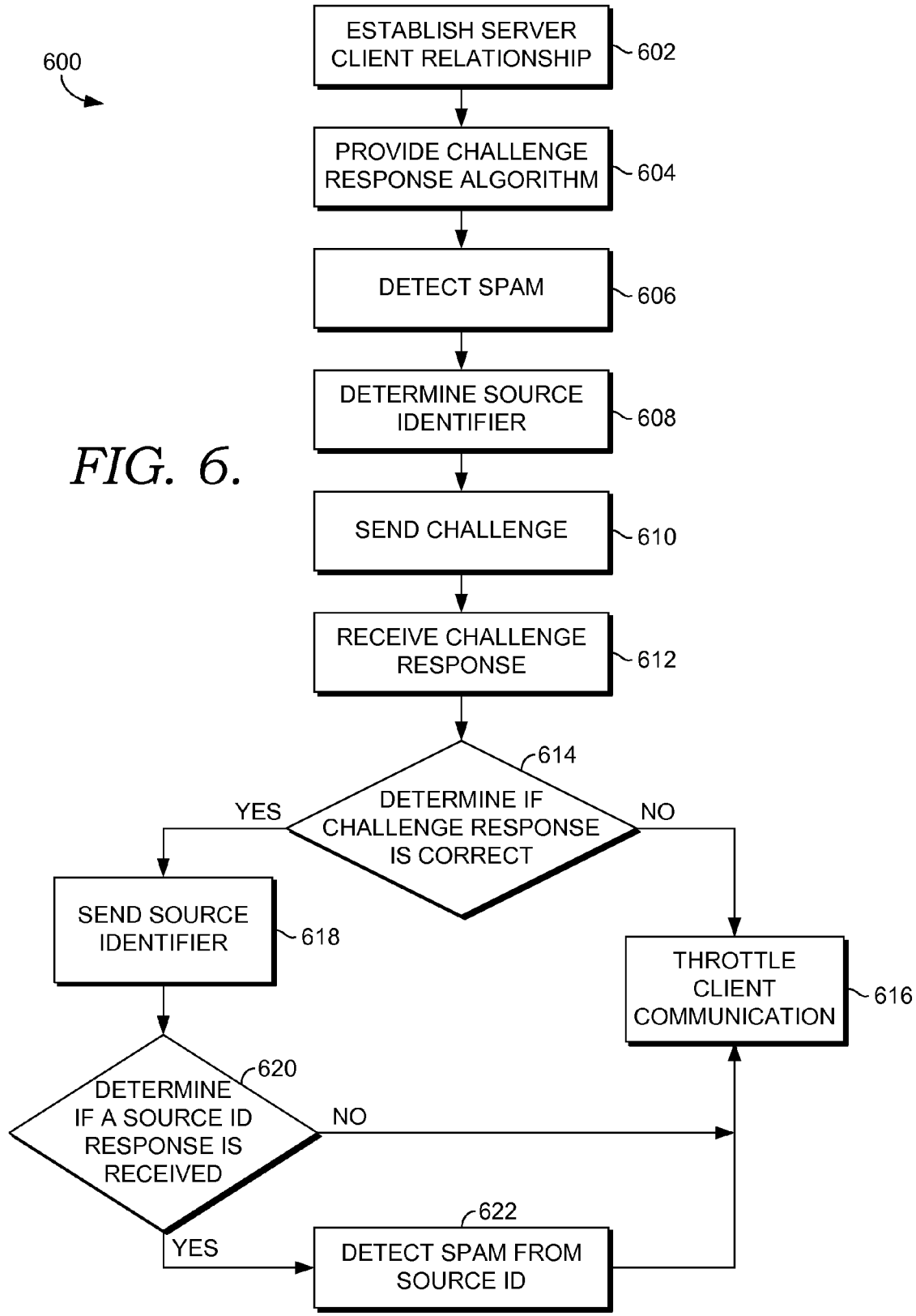
FIG. 6 is an additional flow diagram illustrating a method for suppressing SMS communications from an SMPP client in accordance with an embodiment of the present invention.

Turning to FIG. 6, a flow diagram is illustrated showing a method 600 for suppressing SMS communications from an SMPP client in accordance with an embodiment of the present invention. A server-client relationship is established, as shown at a block 602. The establishment of a server-client relationship typically involves establishing a communication channel that is utilized by the server and the client to communicate. For example, the communication channel allows the flow of information between the two entities in a manner that allows the client to be considered a trusted domain.

A challenge response is provided, as indicated at a block 604. For example, the server provides the challenge response to the client during the establishment of the client relationship so that the server can later verify that the entity to which it is communicated is the same entity (client) to which it established the server-client relationship. Undesired communications, such as SPAM, are detected by the server, as shown at a block 606. Source identifier associated with the SPAM are identified, as shown at a block 608.

In an embodiment a challenge response is communicated from the server to the client as a result of the detection of SPAM, as shown at a block 610. But, in an additional embodiment, the challenge is sent to the client at a regular interval or a sporadic interval to ensure that communications, regardless of the detection of SPAM, are being communicated by the client that established the server-client relationship. At a block 612 it is shown receiving a challenge response. For example, the server receives a challenge response from the client. In an embodiment, the server 204 of FIG. 2 receives a challenge response from the SMPP client 206 of FIG. 2. The challenge response in an exemplary embodiment includes a result derived from the provided response algorithm.

A determination if the challenge response is correct is performed, as shown at a block 614. For example, the determination is made by the server 204 of FIG. 2. When the challenge response is not determined to be correct, the communications of the client are throttled, as shown at a block 616. But, when the challenge response is determined to be correct, a source identifier associated with the detected SPAM is sent, as shown at a block 618. For example, the server 204 of FIG. 2 sends a source identifier associated with the originating source 208 of FIG. 2. to the SMPP client 206 of FIG. 2.

When it is determined that a source identification response, as shown at a block 620, has not been received, the communications associated with the client are throttled, as shown at the block 616. But, when a determination is made that a source identification response has been received and SPAM is detected being associated with the source identifier, as shown at block 622, the communications associated with the client are throttled, as shown at the block 616.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method for suppressing Short Message Service (SMS) communications from a Short Message peer-to-peer (SMPP) client, the method comprising: providing a selected response algorithm to the SMPP client from a server, wherein the selected response algorithm is utilized by the SMPP client to generate a challenge response that verifies the identity of the SMPP client upon the receipt of a challenge from the server; detecting an undesired SMS communication that is communicated to the server by way of the SMPP client; communicating the challenge to the SMPP client from the server; when the challenge response is not received at the server, throttling communications received from the SMPP client; and when the challenge response is received at the server, verify the validity of the challenge response.

2. The method of claim 1, wherein the challenge is communicated to the client in association with an SMPP header that is communicated to the SMPP client.

3. The method of claim 1, wherein the challenge is communicated with a protocol data unit.

4. The method of claim 1, wherein the challenge response is received in association with an SMPP header that is communicated from the SMPP client.

5. The method of claim 1, wherein the challenge response algorithm utilizes one or more values associated with one or more SMPP packets communicated from the SMPP client to generate the challenge response.

6. The method of claim 1, wherein the challenge includes a hexadecimal that indicates a predefined type of challenge.

7. The method of claim 1, wherein the challenge response includes a hexadecimal that indicates a predefined type of challenge response that is identifiable by the server.

8. The method of claim 1 further comprising:
identifying a source identifier associated with the undesired SMS communication; and
communicating the source identifier to the SMPP client.

9. The method of claim 8, further comprising throttling SMS communications associated with the source identifier.

10. The method of claim 1, wherein the validity of the challenge response is verified utilizing the challenge response algorithm.

11. One or more nontransitory computer-readable media having computer-executable instructions embodied thereon that, when executed, perform a method for suppressing Short Message Service (SMS) communications from a Short Message peer-to-peer (SMPP) client, the method comprising:
receiving, at the SMPP client, a selected response algorithm communicated from a server, wherein the selected response algorithm is utilized by the SMPP client to generate a challenge response that verifies the identity of the SMPP client upon the receipt of a challenge from the server;
storing the selected response algorithm, wherein the selected response algorithm is accessible by the SMPP client;
receiving, at the SMPP client, the challenge from the server, wherein the challenge is communicated from the server as a result of the server detecting undesired SMS communications being communicated by way of the SMPP client;
generating the challenge response utilizing the selected response algorithm; and
communicating the challenge response to the server from the SMPP client.

12. The media of claim 11, wherein the SMPP client and the server communicate utilizing technology compatible with SMPP protocol.

13. The media of claim 11 further comprising storing information necessary for the SMPP client to generate the challenge response from the selected response algorithm.

14. The media of claim 13, wherein the information stored to generate the challenge response includes data associated with SMPP headers communicated from the SMPP client.

15. The media of claim 13, wherein the information stored to generate the challenge response includes a counting of the number of SMS messages sent from the SMPP client to the server during a time period identified by the response algorithm.

16. The media of claim 11 further comprising receiving a source identifier from the server, wherein the source identifier identifies a source of the undesired SMS communication.

17. The media of claim 16 further comprising throttling communications associated with the source identifier.

18. The media of claim 17 further comprising communicating to the server that communications associated with the source identifier are throttled by the SMPP client.

19. The media of claim 16 further comprising:
determining that a communication from the source identifier cannot be throttled by the SMPP client; and
communicating to the server from the SMPP client that the communication from the source identifier cannot be throttled.

20. A method for suppressing Short Message Service (SMS) communications from a Short Message peer-to-peer (SMPP) client, the method comprising: providing a selected response algorithm to the SMPP client from a server, wherein the selected response algorithm is utilized by the SMPP client to generate a challenge response that verifies the identity of the SMPP client upon the receipt of a challenge from the server; detecting a first predefined threshold of undesired SMS communication (SPAM) from a SPAM originator that is communicated to the server by way of the SMPP client; identifying a source identifier of the SPAM originator, wherein the source identifier uniquely identifies the SPAM originator; communicating the challenge to the SMPP client from the server; when the challenge response is not received at the server, throttling communications received from the SMPP client; when the challenge response is received at the server and the challenge response is incorrect, throttling communications received from the SMPP client; when the challenge response is received at the server and the challenge response is correct, communicating the source identifier to the SMPP client from the server, wherein the source identifier allows the SMPP client to throttle communications received from the SPAM originator; detecting a second predefined threshold of SPAM from the SPAM originator that is communicated by way of the SMPP client; and throttling communications received from the SMPP client.

* * * * *